United States Patent
Dadds et al.

[15] 3,679,216
[45] July 25, 1972

[54] PRESSURE-BALANCED TRACK ROLLER

[72] Inventors: Floyd S. Dadds, Peoria; James E. Gee, Washington, both of Ill.

[73] Assignee: Caterpillar Tractor Co., Peoria, Ill.

[22] Filed: April 17, 1970

[21] Appl. No.: 29,439

[52] U.S. Cl. .................................. 277/3, 277/27, 277/92
[51] Int. Cl. .............................. F16j 15/40, F16j 15/16
[58] Field of Search .............. 277/3, 27, 73, 92, DIG. 8, 277/59

[56] References Cited

UNITED STATES PATENTS

| | | | |
|---|---|---|---|
| 3,409,306 | 11/1968 | Hayatian | 277/92 |
| 2,085,777 | 7/1937 | Williams | 277/3 |
| 3,403,915 | 10/1968 | Roberts | 277/3 |
| 3,442,515 | 5/1969 | Murauskas | 277/27 |

*Primary Examiner*—Samuel B. Rothberg
*Attorney*—Fryer, Tjensvold, Feix, Phillips & Lempio

[57] ABSTRACT

A pressure balanced track roller for underwater use includes a floating piston for transmitting ambient pressure to the lubricant chamber of a face seal to maintain adequate face loads on the seal rings when the track roller is operated at deep depths underwater.

1 Claim, 3 Drawing Figures

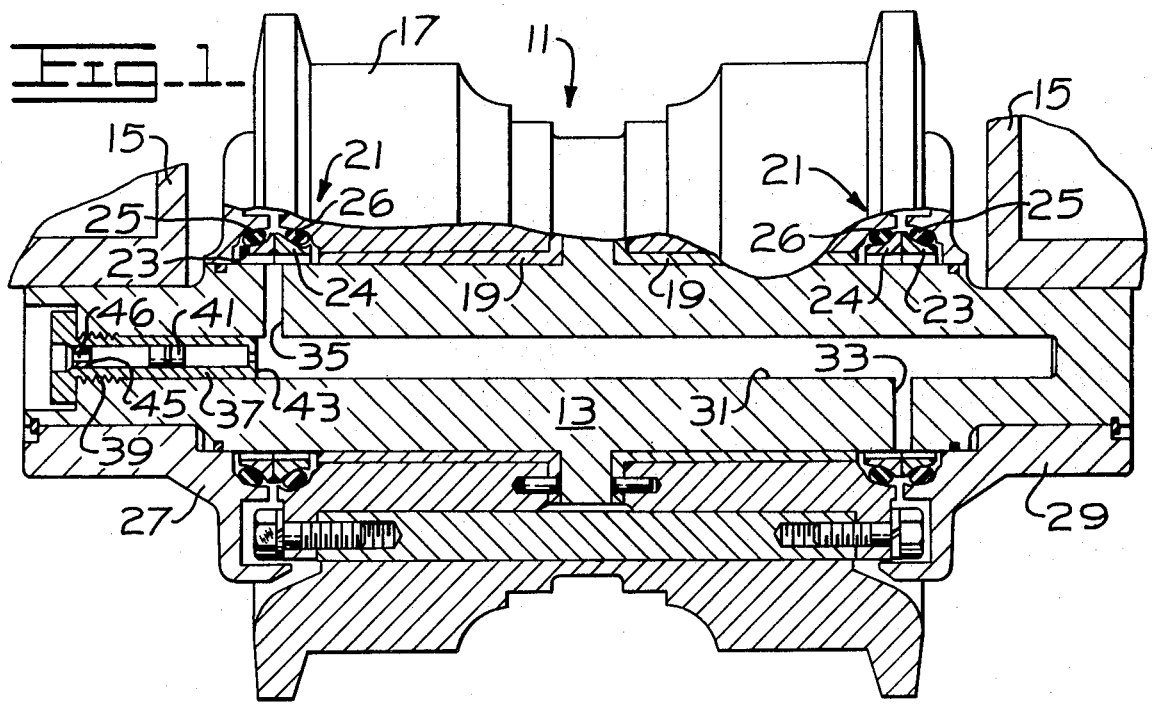
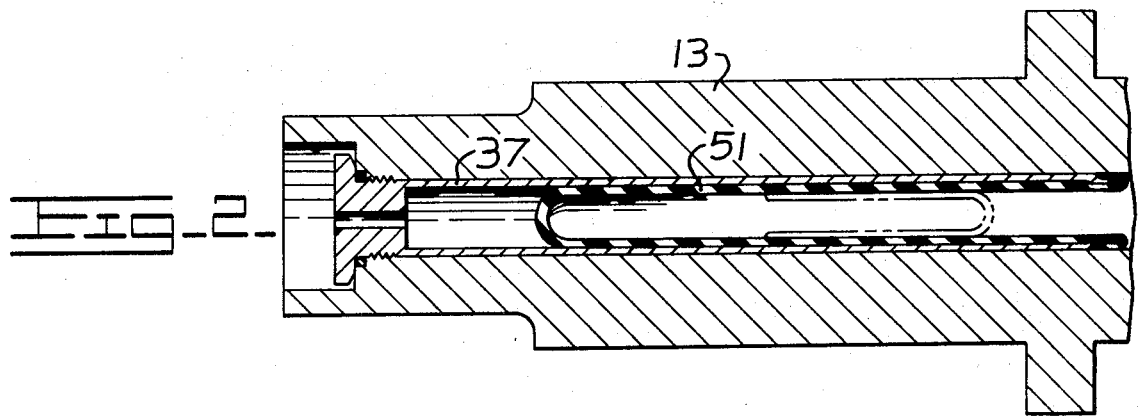
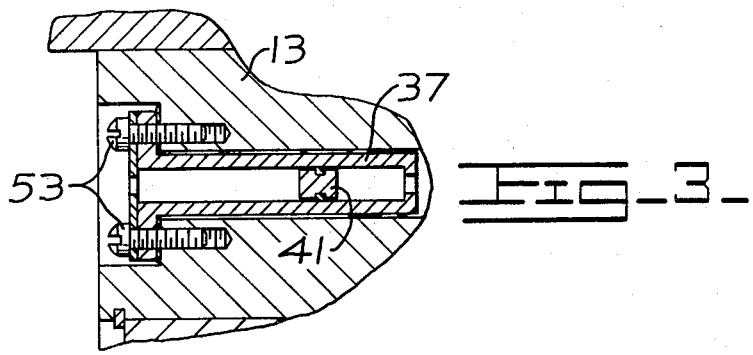

PRESSURE-BALANCED TRACK ROLLER

This invention relates to a resiliently suspended and resiliently loaded face seal. This invention relates specifically to apparatus for balancing the pressure on the resilient suspension of such face seals when the face seals are operated at high ambient pressures such as exist at deep depths underwater.

The present invention has particular application as a pressure balancing arrangement for the face seals of a track roller of a track type tractor.

The track rollers of such tractors are mounted for rotation on stationary shafts and have floating ring seals at each end of the roller between the shaft and the roller. Each of the floating ring seals includes a pair of seal rings. Each ring has a resilient member, usually a torus, suspending and pressing the rings into sealing engagement.

When the tractor is operated in deep water, say at a depth of 200 feet, the ambient pressure is in the order of 100 PSI. The outer sides of the resilient toric members are directly exposed to this high ambient pressure. If a balancing pressure of sufficient magnitude is not developed on the inner sides of the resilient toric members, the high ambient pressure acting on the outer sides of the resilient toric members can force the seal rings apart and thus break the seals.

The shaft has an inner bore which is substantially filled with lubricant and which has passageways leading to the inner sides of the resilient toric members.

It is a primary object of the present invention to produce pressurization of this inner bore to maintain adequate face loads on the seal rings when the track roller is operated at deep depths underwater.

In accordance with one form of the present invention a cylinder is fitted at one end of the bore and a floating piston is mounted for movement within the cylinder in response to an increase in the ambient pressure. Inward movement of the piston increases the pressure within the bore and balances the pressures on the resilient toric members to maintain adequate face loads on seal rings.

The cylinder and the piston are preferably made of a non-corrosive material for operation in salt water, and the cylinder has inner and outer stops for limiting the extent of movement of the loading piston.

A pressure balanced seal arrangement having the structural features described above and effective to function in the manner described constitute further specific objects of the present invention.

Other and further objects of the present invention will be apparent from the following description and claims are are illustrated in the accompanying drawing which, by way of illustration, shows preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

IN THE DRAWINGS

FIG. 1 is an elevation view, partly in section to show details of construction, of a track roller constructed in accordance with one embodiment of the invention;

FIG. 2 is a fragmentary enlarged view showing an alternate form of enclosure for the end of the track roller shown in FIG. 1; and FIG. 3 is a fragmentary enlarged view showing an alternate form of attachment for the cylindrical member of FIG. 1.

DETAILED DESCRIPTION OF THE INVENTION

A track roller constructed in accordance with one embodiment of the present invention is indicated generally by reference numeral 11 in FIG. 1.

The track roller 11 has a stationary shaft 13 attached to the undercarriage 15 of the tractor.

A roller 17 is mounted for rotation on the shaft 13.

The track roller 11 includes a bushing 19 between the rotatable roller 17 and the stationary shaft 13.

At each end of the roller 17 there is a floating ring seal indicated generally by the reference numeral 21.

Each floating ring seal 21 has a pair of seal rings 23 and 24 engaged in a face seal.

The seal rings 23 and 24 are suspended by resilient toric members 25 and 26.

The face load is transmitted through the toric members 25 and 26 as these toric members are compressed during the assembly of the end caps 27 and 29 on the shaft 13.

The interior of the shaft 13 has a bore 31 and passageways 33 and 35 extending from the bore 31 to the interior of the seals 21. The bore 31 and passageways 33 and 35 are substantially filled with lubricant.

As can readily be seen by viewing the lower half of FIG. 1, the ambient pressure, which can be substantial in deep water, is exerted directly on the outer surfaces of the toric members 25 and 26 in a direction to reduce the face loads on the seal rings 23 and 24. If the pressure becomes too great, and if a balancing pressure is not exerted on inner sides of the toric members 25 and 26, the seal rings 23 and 24 can be separated.

In accordance with the present invention a cylindrical member 37 is attached, as by threads 39, at one end of the bore 31. The member has an opening 46 for transmitting fluid pressure to the interior of the cylinder.

A floating piston 41 is mounted within the bore for movement between an inner stop 43 and an outer stop 45.

In the assembly of the track roller 11 the track roller may be turned on its side and the bore 31 filled with lubricant and the cylindrical member 37 then installed with the floating piston 41 against the stop 45.

As the track roller 11 is immersed in deep water the floating piston 41 moves toward the stop 43 and transmits the ambient pressure through the lubricant in the bore 31 and the passageways 35 and to the inner sides of the toric members 25 and 26 to balance the pressures on the inner and outer sides of the toric members. This in turn permits the toric members to maintain adequate face loads on the seal rings 23 and 24.

The cylindrical member 37 and floating piston 41 are preferably made of some non-corrosive material such as brass.

FIG. 2 shows a modified form of the present invention in which a flexible diaphragm 51 is used in place of the floating piston 41.

FIG. 3 shows a further modified form of the present invention in which cap screws 53 are used in place of the threads 39 of the FIG. 1 form of the present invention.

It is contemplated that the invention described above with respect to a track roller is also applicable to the resiliently loaded face seal of an idler wheel, a final drive or other compartmentalized component of a vehicle operated at deep depths underwater.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A pressure balanced track roller for underwater use and comprising, a shaft, a roller mounted for rotation on the shaft, floating ring seals at each end of the roller between the shaft and the roller, each of said floating ring seals including a pair of seal rings and each ring having a resilient member suspending and pressing the rings into sealing engagement, the outer side of each of the resilient members being directly exposed to ambient pressure, a bore within the shaft substantially filled with lubricant, said bore having an end in communication with ambient pressure and having passageways leading to the inner side of each of the resilient members, and a movable wall member disposed in the bore intermediate the bore end and the passageways for closing the bore and for transmitting ambient pressure through lubrication fluid in the bore to the inner sides of the resilient members to balance external forces on the resilient member and thereby maintain the same face load on the seal rings at any ambient pressure.

* * * * *